C. BRANDT.
RESILIENT WHEEL.
APPLICATION FILED JUNE 12, 1916.

1,234,273.

Patented July 24, 1917.

WITNESSES
Howard J Costello
Wm. S Fowler

INVENTOR
Charles Brandt
BY
Richard Owen
ATTORNEY

UNITED STATES PATENT OFFICE.

CHARLES BRANDT, OF CLAREMORE, OKLAHOMA.

RESILIENT WHEEL.

1,234,273.     Specification of Letters Patent.     Patented July 24, 1917.

Application filed June 12, 1916. Serial No. 103,237.

*To all whom it may concern:*

Be it known that I, CHARLES BRANDT, a citizen of the United States, residing at Claremore, in the county of Rogers and State of Oklahoma, have invented certain new and useful Improvements in Resilient Wheels, of which the following is a specification.

This invention relates to certain new and useful improvements in resilient wheels.

The primary object of this invention is the provision of a resilient wheel which will be of simple construction and operation.

Another object of the invention resides in the provision of a resilient wheel in which will be included arcuate spring members positioned between inner and outer fellies and means for limiting the movement of said fellies with respect to one another.

A further object of the invention resides in the provision of a resilient wheel in which will be included novel movement limiting means between the arcuate spring members.

The invention has for a still further object the provision of a resilient wheel in which one of the side plates will be carried by the outer rim, while the opposite side plate will be removably secured to the first-mentioned side plate and resilient members are supported by ears arranged in pairs and directed inwardly from said side plates toward the hub of the wheel, to form resilient connections between said side plates and said inner rim.

With the above objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views:—

Figure 1:
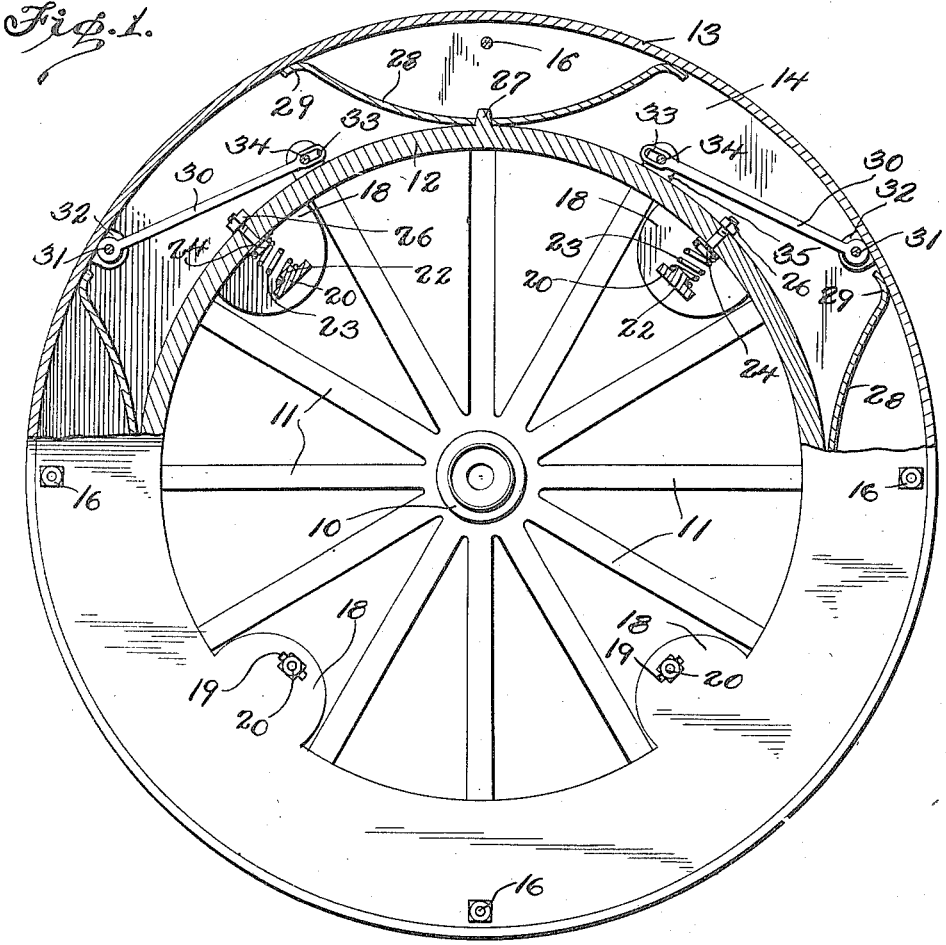
Figure 1 is a side elevation of a complete wheel constructed in accordance with my invention and shown partly in section.
Figure 2:
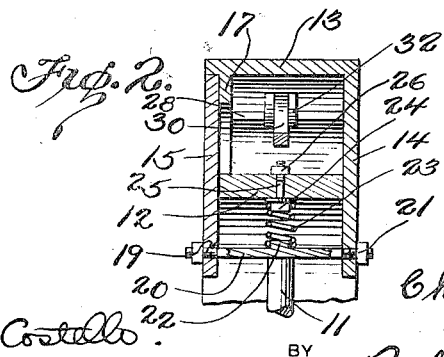
Fig. 2 is a detail transverse section of a portion of the wheel.

Referring more in detail to the accompanying drawings, 10 designates the hub carrying the spokes 11, upon the outer ends of which is mounted the inner stationary felly 12.

The outer movable felly 13 surrounds the felly 12 and has a rigid side plate 14 formed therewith and extended toward the hub 10. The removable side plate 15 corresponds to the side plate 14 and is connected with the same by means of suitable connecting bolts 16, the outer movable felly 13 being provided upon its inner face with a small annular flange 17 to prevent inward movement of the removable plate 15. The side plates 14 and 15 are also provided with pairs of ears 18 directed toward the hub 10 and provided with elongated transverse slots 19 to accommodate the ends of spring supporting bolts 20.

The bolts 20 are held in proper position by means of suitable nuts 21 threaded upon their outer ends and lugs 22 are formed upon the bolts 20 intermediate their ends to support one end of the cushioning springs 23, the opposite ends of which are engaged around the heads 24 of the bolts 25 extended through the inner stationary felly 12 between certain of the spokes 11 and having nuts 26 threaded upon their outer ends and bearing upon the outer face of said felly 12.

The felly 12 also has lugs 27 formed upon its outer face intermediate the bolts 25, to support the arcuate springs 28 which latter are secured centrally upon said lugs 27 and have their outer ends 29 turned back and bearing against the inner face of the outer rim 13 to resiliently space the latter from said inner rim 12.

Inward movement of the outer rim 13 as well as rotation of the same around the inner rim 12 is limited by means of the movement limiting links 30 having their outer ends mounted upon the pivot pins 31 secured in the pairs of ears 32 formed on the inner face of the outer rim 13. The inner ends of said links 20 are enlarged and provided with elongated slots 33 through which are engaged the pins 34 carried by the pairs of ears 35 formed on the outer face of the inner rim 12 between the bolts 25 and the lugs 27. It will be understood that the ends of the links 30 are positioned between the lugs 35 and the adjacent links 30 are extended in opposite directions as will be readily understood by referring to Fig. 1 of the drawings. It will also be seen by referring to this figure that only one link 30 is provided between each pair of springs 28.

From the foregoing, it will be understood that I have provided an improved form of resilient wheel which will be of extremely simple and inexpensive construction and in which the outer rim 13 will be at all times resiliently retained in proper position with relation to the inner rim 12.

While the form of the invention herein shown and described is what is believed to be the preferred embodiment thereof, it is nevertheless to be understood that minor changes may be made therein without departing from the spirit and scope of the invention as claimed.

What I claim as new is:—

1. A resilient wheel comprising a hub, spokes carried by said hub, a stationary inner rim mounted upon said spokes, a movable outer rim, resilient members positioned between said inner and outer rims, connections between said inner and outer rims to limit movement of said outer rim with respect to said inner rim, side plates carried by said outer rim, ears projecting inwardly from said side plates, bolts extended through said ears and movable with respect to the latter, springs positioned between said bolts and said inner rim, and means for engaging with the opposite ends of said springs to retain the latter in proper position.

2. In a spring wheel an outer rim, permanently secured ears carried thereby, an inner rim, resilient means interposed between the two rims, removable ears detachably secured to the outer rim and arranged in parallelism with the first named ears, removable bolts connecting the ears and each provided with a flattened portion, and coil springs supported on the flattened portions of the bolts and bearing against the inner rim.

In testimony whereof I affix my signature in presence of two witnesses.

CHARLES BRANDT.

Witnesses:
 JOHN T. EZZARD,
 GWYNNE H. JENNINGS.